(12) United States Patent
Sayano et al.

(10) Patent No.: US 10,312,963 B2
(45) Date of Patent: Jun. 4, 2019

(54) SYSTEMS AND METHODS FOR USE IN COMMUNICATING DATA

(71) Applicant: The Aerospace Corporation, El Segundo, CA (US)

(72) Inventors: Masahiro Sayano, Torrance, CA (US); Michael S. Cheung, Fullerton, CA (US); Oliver D. Ambrosia, Los Angeles, CA (US); David M. Schwartz, Northridge, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 15/246,295

(22) Filed: Aug. 24, 2016

(65) Prior Publication Data

US 2018/0063314 A1    Mar. 1, 2018

(51) Int. Cl.
*H04W 4/12* (2009.01)
*H04B 1/715* (2011.01)
(Continued)

(52) U.S. Cl.
CPC .......... *H04B 1/7156* (2013.01); *H04B 1/715* (2013.01); *H04W 4/12* (2013.01); *H04B 7/18523* (2013.01); *H04W 84/06* (2013.01)

(58) Field of Classification Search
CPC H04B 1/7143; H04B 1/7156; H04B 7/15528; H04B 7/18523; H04W 4/12; H04W 84/06; H04M 1/72519
See application file for complete search history.

(56) References Cited

U.S. PATENT DOCUMENTS

| 8,627,233 B2 * | 1/2014 | Cragun ............... G06F 3/04812 715/823 |
| 2006/0215603 A1 * | 9/2006 | Nishio ................... H04B 1/713 370/329 |

(Continued)

OTHER PUBLICATIONS

W. C. Lindsey and M. K. Simon, Design of One-Way and Two-Way Phase-Coherent Communication Systems, Telecommunication Systems Engineering, Chapter 7, pp. 337-390, New York: Dover Publications, 1991.

(Continued)

*Primary Examiner* — Sung S Ahn
(74) *Attorney, Agent, or Firm* — Manita Rawat; Duane Morris LLP

(57) ABSTRACT

A system comprises a transmitter configured to receive at least one message that corresponds to at least one set of data received from at least one user. The transmitter includes a modulating device that is configured to generate at least one signal that corresponds to the received message, wherein the signal includes at least one sequence of a plurality of hopping patterns. A receiver is coupled to the transmitter, wherein the receiver is configured to receive the signal. The receiver includes a demodulating device that is configured to identify the sequence of the hopping patterns and to determine at least one variable that corresponds to the sequence of the hopping patterns. The demodulating device is further configured to generate at least one output that is based on the determined variable, wherein the output is displayed such that at least one other user is enabled to view the output.

21 Claims, 6 Drawing Sheets

(51) Int. Cl.
*H04B 7/185* (2006.01)
*H04W 84/06* (2009.01)
*H04B 1/7156* (2011.01)

(56) References Cited

U.S. PATENT DOCUMENTS

| | | | | |
|---|---|---|---|---|
| 2007/0211785 A1* | 9/2007 | Nakache | ............. | H04B 1/7156 375/136 |
| 2008/0291985 A1* | 11/2008 | Adnani | ................. | H03D 3/006 375/220 |
| 2010/0322080 A1* | 12/2010 | Sung | .................... | H04L 5/0007 370/242 |

OTHER PUBLICATIONS

B. Skylar, Bandpass Modulation and Demodulation, Digital Communications Fundamentals and Applications, Chapter 3, pp. 118-186, 2nd Edition, New Jersey: Prentice Hall PTR, 2001.

* cited by examiner

SYSTEMS AND METHODS FOR USE IN COMMUNICATING DATA

STATEMENT OF GOVERNMENT INTEREST

This invention was made with government support under Contract No. FA8802-14-C-0001 awarded by the Department of the United States Air Force. The government has certain rights in this invention.

BACKGROUND

The embodiments described herein relate generally to systems that facilitate communication of data, such as the communication of data in satellite communication systems.

At least some known systems, such as satellite communication systems, include the transmission of data using signals between, for example, a ground station and a satellite that may be in orbit. During communication, the signals may be altered from various inference resulting in distorted signals. Such distortions may inhibit the accuracy of the data that is being communicated within the system. At least some known systems and methods are used for substantially reducing the effect of interference. Such known systems and methods can involve the use of a total bandwidth that does not include the interferers, by identifying and then removing the interferers from where and/or when they are resident. For example, some methods utilize spread spectrum techniques or signal excision techniques based on the determination of spectral occupancy, followed by excision or avoidance of the interfering signal(s). To perform both of these techniques, additional bandwidth may be required. In at least some known techniques involving frequency hopping or direct sequence spread spectrum, the signal is transmitted across the entire bandwidth, regardless of the location of the interference. An additional known method used is to identify the interfering signals to sufficient fidelity that they can be isolated, reconstructed, and/or extracted.

However, such known techniques cannot be used in some types of applications. For example, some cases involve long propagation delays or significantly different radio environments that are observed by the transmitter and receiver. Such delays or different environments make it difficult to relay sufficiently accurate information to enable such techniques to be effective. Therefore, in these instances, for example, the adaptive nature of cognitive radios cannot be effectively utilized. Moreover, with reconstruction and extraction of interfering signals, it may not be feasible to have sufficient knowledge of the characteristics of the interference source. In addition, at least some of the known techniques identified above may reduce the overall data and/or may require additional signal power beyond that which is needed for communications.

BRIEF DESCRIPTION

The embodiments described herein provide a system that enables the modulation and demodulation of signals that are effective in mitigating interference under contested and/or congested environments, and can be used in various communications applications, such as, but not limited to, low data rate satellite communications applications. For example, in some embodiments, a system is provided. The system includes a transmitter that is configured to receive at least one message, wherein the message corresponds to at least one set of data received from at least one user. The transmitter includes a modulating device that is configured to generate at least one signal that corresponds to the received message, wherein the signal includes at least one sequence of a plurality of hopping patterns. A receiver is coupled to the transmitter, wherein the receiver is configured to receive the signal. The receiver includes a demodulating device that is configured to identify the sequence of the hopping patterns and to determine at least one variable that corresponds to the sequence of the hopping patterns. The demodulating device is further configured to generate at least one output that is based on the determined variable, wherein the output is displayed such that at least one other user is enabled to view the output. The system incorporates features in both the transmitter and the receiver that enhance ability to mitigate effects of interference.

In other embodiments, a method of communicating data is provided. The method includes receiving at least one message, via a transmitter, wherein the message corresponds to at least one set of data received from at least one user. At least one signal that corresponds to the received message is generated via a modulating device within the transmitter, wherein the signal includes at least one sequence of a plurality of hopping patterns. A receiver is coupled to the transmitter to enable communication between the receiver and the transmitter. At least one signal is transmitted from the transmitter to the receiver. The sequence of the hopping patterns are identified via a demodulating device within the receiver. At least one variable that corresponds to the sequence of the hopping patterns is determined. At least one output that is based on the determined variable is generated, wherein the output is displayed such that at least one other user is enabled to view the output.

In some embodiments, a system is provided that includes a transmitter assembly that includes a first computing device, which is configured to receive at least one set of data from at least one user, and the first computing device is further configured to generate at least one message that corresponds to the set of data. A transmitter is coupled to the first computing device, wherein the transmitter is configured to receive the message. The transmitter includes a modulating device that is configured to generate at least one signal that corresponds to the received message, wherein the signal includes at least one sequence of a plurality of hopping patterns. The system also includes a receiver assembly in communication with the transmitter assembly, wherein the receiver assembly includes a receiver that is configured to receive the signal. The receiver includes a demodulating device that is configured to identify the sequence of the hopping patterns and to determine at least one variable that corresponds to the sequence of the hopping patterns. The demodulating device is also configured to generate at least one output that is based on the determined variable. A second computing device is coupled to the receiver, wherein the second computing device is configured to display the output such that at least one other user is enabled to view the output.

DETAILED DESCRIPTION

Figure 1:
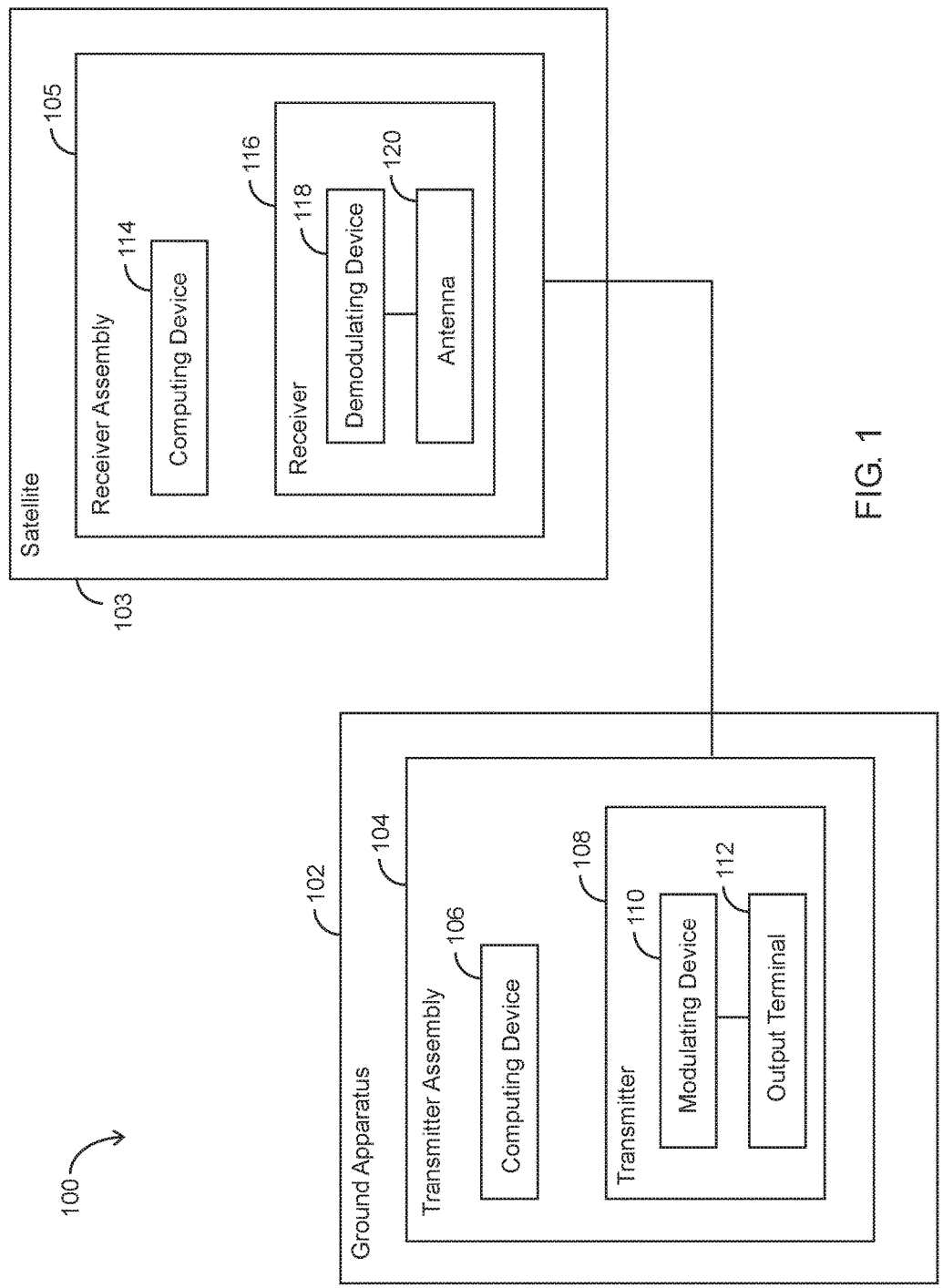
FIG. 1 is a block diagram of an exemplary system that includes an exemplary transmitter assembly and an exemplary receiver assembly in accordance with some embodiments of the present disclosure.

FIG. 1 illustrates an exemplary system 100 that can be used for communications applications. For example, in some embodiments, system 100 can be a satellite communication system that includes a ground apparatus 102 that may be positioned at a location on earth (not shown) and a satellite 103 that is located in a remote area away from ground apparatus 102, such as in orbit. Although the exemplary embodiment illustrates a satellite communication system, the present disclosure is not limited to such systems and one of ordinary skill in the art will appreciate that the current disclosure may be used in connection with other types of communication systems.

In some embodiments, ground apparatus 102 includes a transmitter assembly 104 that is coupled to a receiver assembly 105 within satellite 103. It should be noted that, as used herein, the term "couple" is not limited to a direct mechanical, communication, and/or an electrical connection between components, but may also include an indirect mechanical, communication, and/or electrical connection between two or more components or a coupling that is operative through intermediate elements or spaces. For example, various connections may be available between transmitter assembly 104 and receiver assembly 105. Such connections may include, without limitation, an electrical conductor, a low-level serial data connection, such as Recommended Standard (RS) 232 or RS-485, a high-level serial data connection, such as USB, a field bus, a PROFIBUS®, or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside system 100) network connection, whether wired or wireless. PROFIBUS is a registered trademark of Profibus Trade Organization of Scottsdale, Ariz. IEEE is a registered trademark of the Institute of Electrical and Electronics Engineers, Inc., of New York, N.Y. BLUETOOTH is a registered trademark of Bluetooth SIG, Inc. of Kirkland, Wash. As described in more detail below, other methods and/or instruments may be used for connections.

In some embodiments, transmitter assembly 104 includes a computing device 106. In some embodiments, as explained in more detail below with respect to FIG. 2, computing device 106 can be a desktop computer, laptop, mobile device, tablet, thin client, or other device, such that computing device 106 is enabled to receive data from a user and is enabled to process the data.

In some embodiments, transmitter assembly 104 also includes a transmitter 108 that is coupled to computing device 106. Transmitter 108 includes a modulating device 110. In some embodiments, modulating device 110 includes a circuit (not shown) or a processor (not shown) that is configured to process data received from a user and to generate signal(s) that are representative of the data received from the user. In some embodiments, modulating device 110 may be programmed with one or more software modules to perform the process. This process is explained in more detail below with respect to FIGS. 3-7. Transmitter 108 can also include an output terminal 112 coupled to modulating device 110, wherein output terminal 112 is configured to transmit the signals generated by modulating device 110 to receiver assembly 105.

Receiver assembly 105, in some embodiments, includes a computing device 114. As explained in more detail below with respect to FIG. 2, computing device 114 can be a desktop computer, laptop, mobile device, tablet, thin client, or other device, such that computing device 114 is enabled to receive and process data that can be displayed to a user. In some embodiments, receiver assembly 105 also includes a receiver 116 coupled to computing device 114. Receiver 116 includes a demodulating device 118, which can include a circuit (not shown) or a processor (not shown) to enable demodulating device 118 to process the signals received from transmitter assembly 104. In some embodiments, demodulating device 118 may be programmed with one or more software modules to perform the process. This process is explained in more detail below with respect to FIGS. 3-7. In some embodiments, receiver 116 includes an antenna 120 coupled to demodulating device 118. Antenna 120 is configured to receive the signal(s) being transmitted from transmitter assembly 104.

During operation, system 100 enables the modulation and demodulation of a plurality of signals that are effective in mitigating interference under contested and/or congested environments. Moreover, system 100 incorporates features in both transmitter 108 and receiver 116 that enhance ability to mitigate effects of interference. As explained in more detail below with respect to FIGS. 3-7, transmitter assembly 104 is configured to receive at least one set of data from one or more users, via computing device 106. The set of data can include, for example, messages, such as text messages, that are made up textual words that the user would like to communicate from, for example, ground apparatus 102 to satellite 103. Computing device 106 can generate at least one message that corresponds to the set of data that is received from the user. Modulating device 110 generates at least one signal, such as a modulated signal or a continuous phase signal, that corresponds to the message, wherein the signal includes at least one sequence of a plurality of hopping patterns. In some embodiments, the signal is a continuous phase signal since it provides a way by which to enable the spectrum to be more effectively contained where it needs to be. The signal can be transmitted to receiver assembly 105, wherein the signal is then demodulated. The signal can be coherently or non-coherently demodulated. For example, in some embodiments, after receiving the signal is received via antenna 120, demodulating device 118 identifies the sequence of the hopping patterns and determines at least one variable that corresponds to the sequence of the hopping patterns. As described in more detail below, demodulating device 118 can identify the sequence of the hopping patterns by identifying the timing of the signal and/or identifying an energy level of the signal. The variable can be, for example, a unique textual word such that each sequence of the hopping patterns is representative of a distinct word being used in the text message being sent by the user. Demodulating device 118 can generate an output, such as a visual representation of the text message, that can be displayed, via computing device 114, for another user to view.

Figure 2:
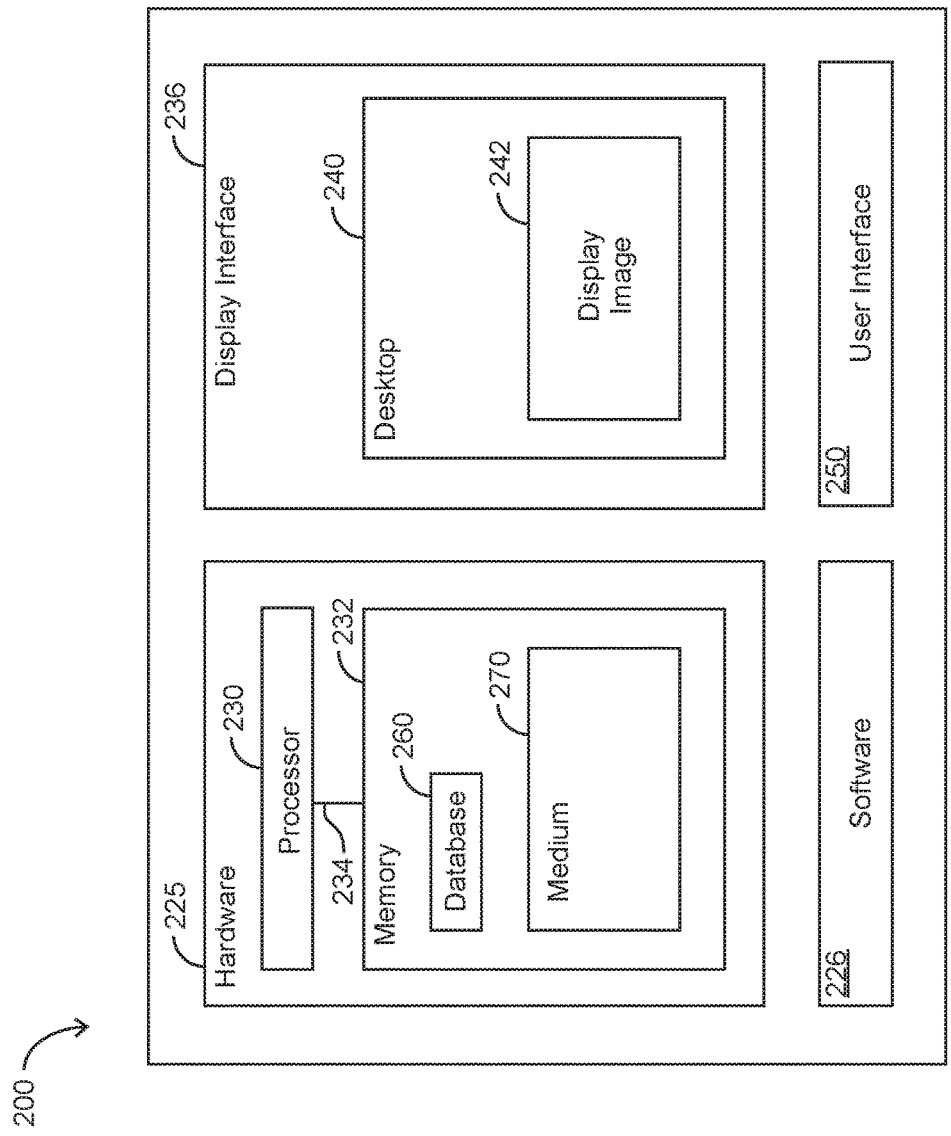
FIG. 2 is a block diagram of an exemplary computing device that can be used to implement one or more components of the transmitter assembly and the receiver assembly of the system shown in FIG. 1 in accordance with some embodiments of the present disclosure.

FIG. 2 illustrates an exemplary computing device 200, which may be used to implement computing device 106 (shown in FIG. 1) or computing device 114 (shown in FIG. 1). Computing device 200 may also be used to implement modulating device 110 (shown in FIG. 1) or demodulating device 118 (shown in FIG. 1). In some embodiments, computing device 200 includes a hardware unit 225 and software 226. Software 226 can run on hardware unit 225 such that various applications or programs can be executed on hardware unit 225 by way of software 226. In some embodiments, the functions of software 226 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor."

Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (NIC), and/or other device(s).

In some embodiments, computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 200 can output at least one desktop, such as desktop 240. Desktop 240 can be an interactive user environment provided by an operating system and/or applications running within computing device 200, and can include at least one screen or display image, such as display image 242, which may include a visualization of outputs (not shown) generated by computing device 106 and/or computing device 114 as described herein. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, display image 242 can be presented to a user on computer displays of a remote terminal (not shown). For example, computing device 200 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 200 and the remote terminals or the servers, such that remote end users can access the information from computing device 200.

In some embodiments, computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 200, in some embodiments, can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage media 270 (only one being shown in FIG. 2). Computer storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein, e.g., steps of the processes shown in FIG. 3.

Figure 3:
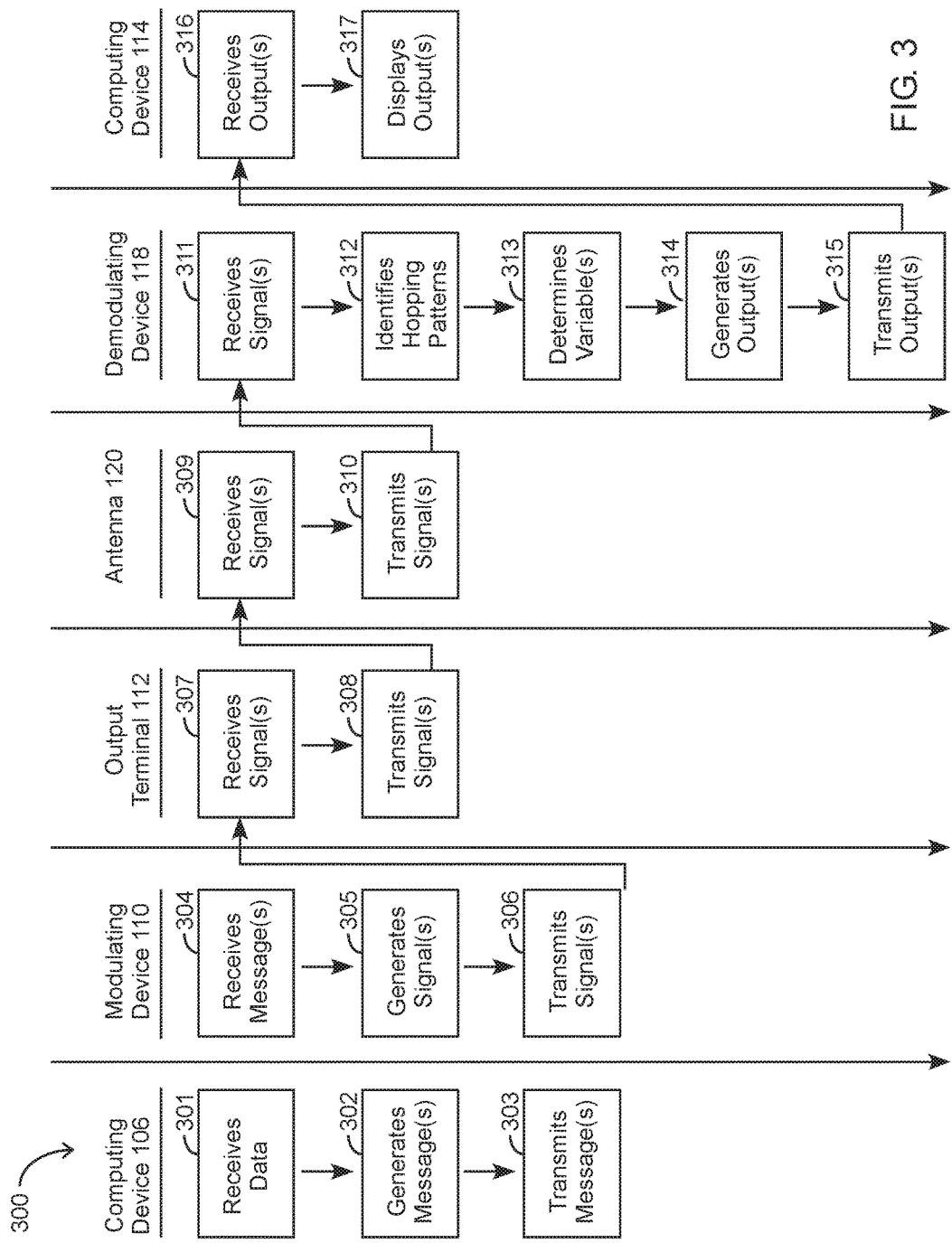
FIG. 3 is a swimlane diagram of an exemplary method of communicating data using the system shown in FIG. 1 in accordance with some embodiments of the present disclosure.

FIG. 3 is a swimlane diagram of an exemplary method 300 of communicating data, using system 100 (shown in FIG. 1). This method 300 may be embodied within a plurality of computer-executable instructions stored in one or more memories, such as one or more computer-readable storage medium 270 (shown in FIG. 2). As described above, computer storage mediums 270 can include non-transitory media and may include volatile and nonvolatile, removable and non-removable mediums implemented in any method or technology for storage of information such as computer-readable instructions, data structures, program modules, or other data. The instructions may be executed by one or more processors, such as processor 230 (shown in FIG. 2), to perform the functions described herein.

In step 301, computing device 106 receives, from at least one user, at least one set of data. The set(s) of data can be inputted directly into computing device 106 via a user interface, such as user interface 250 (shown in FIG. 2), or the data can be transmitted by a user from a remote computing device (not shown) that is in communication with computing device 106. In some embodiments, various different users can each input or transmit a different set of data to computing device 106. Each set of data can be, for example, a textual message being submitted by the respective user. In some embodiments, the message can be a textual message that the user desires to communicate, for example, from ground apparatus 102 (shown in FIG. 1) to satellite 103 (shown in FIG. 1). In step 302, computing device 106 generates at least one message that corresponds to the received set(s) of data. When different sets of data are submitted by different users, then computing device 106 generates multiple messages such that each message corresponds to a different set of data. In step 303, computing device 106 transmits the message(s) to transmitter 108 (shown in FIG. 1).

Figure 4:
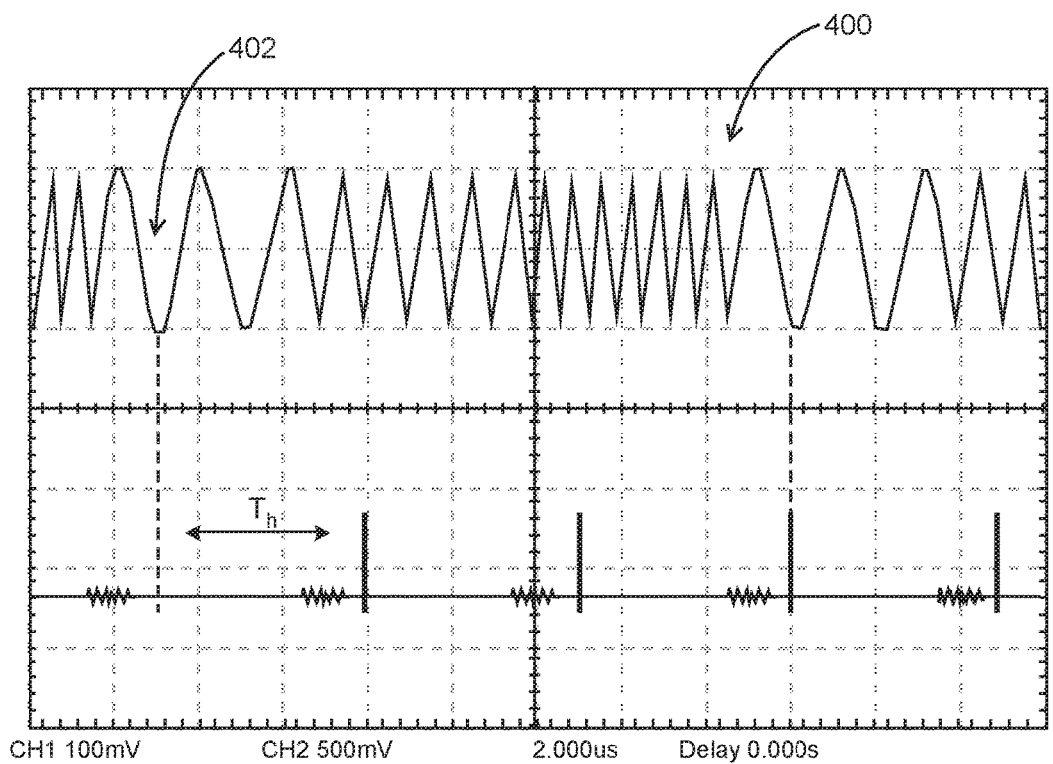
FIG. 4 is a graphical diagram of an exemplary transition of frequency hops that can be used for the method shown in FIG. 3.

In step 304, modulating device 110 receives the message (s). In step 305, modulating device 110 generates at least one signal that corresponds to the received message(s). In some embodiments, the signal is representative of at least one sequence of a plurality of hopping patterns. In some embodiments, when multiple messages are received from various different users, the signal can include a plurality of sequences of a plurality of hopping pattern, such that each of the sequences corresponds to a different received message. In some embodiments, as shown in FIG. 4, the sequence of hopping patterns can be a set of reproducible frequency hop tones 400 that are of constant amplitude, or are of different amplitudes. As shown in FIG. 4, for example, each tone 400 is generated for temporal duration of $T_h$. Also, at each hop transition 402 between tones, the generated signal can be continuous in phase. In some embodiments, this signal can be generated by known suitable digital methods so that the signal can be reproduced to be substantially identical at different locations, within a constant phase offset. In some embodiments, a sequence of hops can represent a unique textual "word".

In some embodiments, a possibly orthogonal set of sequences of $M=2^m$ hops each can be used to generate "M" distinct symbols that may be orthogonal. Each symbol can also represent a set of m distinct bits. Since the information is contained within the hopping pattern itself, data or information being contained therein can be increased. Orthogonality is not necessary but is a desired feature of the system.

For the generation of a set of orthogonal frequency hops to represent each "M-ary" signal, two constraints can be used to enable the orthogonality. The two constraints include (1) that no two symbols can occupy the same frequency on the same hop, so that $f_k(n) \neq f_j(n)$ and (2) the same frequency cannot be used for two subsequent hops, so that $f_k(n) \neq f_k(n-1)$. In some embodiments, $f_k(n)$ represents the frequency of the $k^{th}$ symbol on the $n^{th}$ hop. These two approaches can be used to construct a unique set of orthogonal hop sequences of length "M" hops, for a set of "N" distinct users. As such, no two users share a single unique code word.

Figure 5:
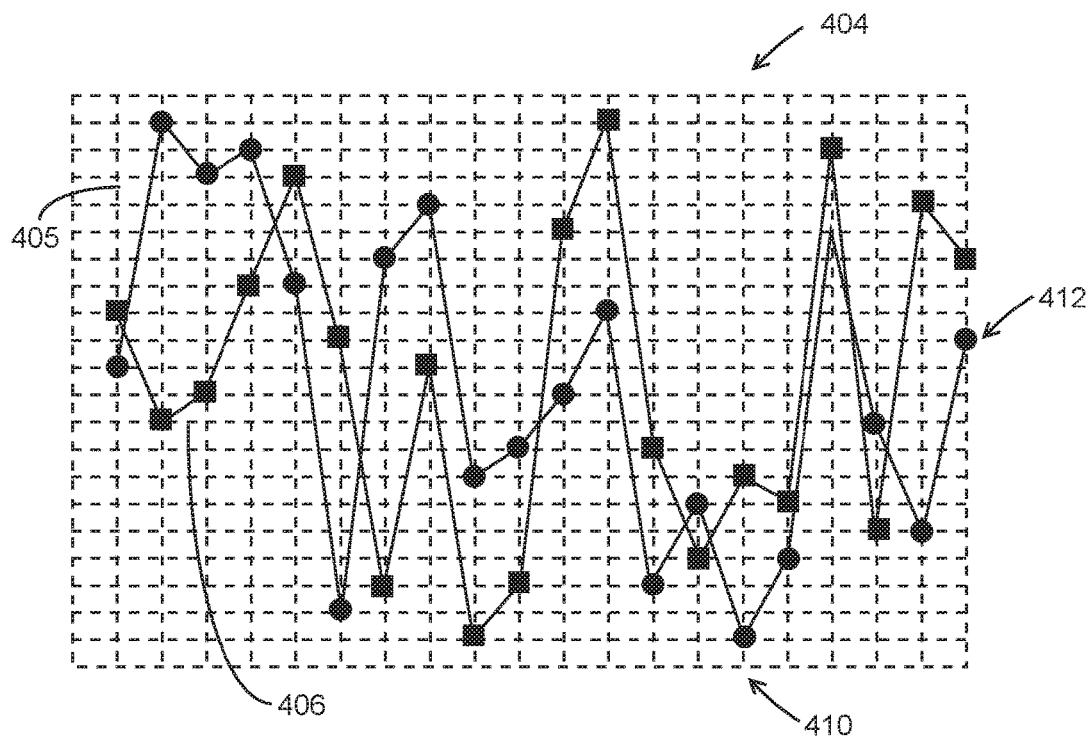
FIG. 5 is a graphical diagram of an exemplary orthogonal code word sets that can be used for the method shown in FIG. 3.

An example showing 3 code words generated by these rules is shown in FIG. 5. For example, as shown in the graphical representation 404 in FIG. 5, each line and marker set 405 and 406 represents a sequence, which is a symbol, such as a letter in the alphabet and/or a numeric value. In some embodiments, the X-axis 410 is time and Y-axis 412 is frequency. There can be M hops and M markers, with each marker placed at a different frequency. In some embodiments, each sequence and each symbol represents m bits of information. In some embodiments, no two sequences have the same frequency at the same time.

This construction is started by first partitioning the available hop bandwidth into "K" non-overlapping frequency bins. In some embodiments, for orthogonality, each sequence may not use the same frequency at the same point in time, as any other sequence. To minimize self-generated inter-hop interference, the frequency bins can be separated by at least a multiple of the hop rate. For example, the hopping rate $R_h$ can be $10^5$ hops per second=100 khps and the available bandwidth can be W=102.4 MHz. Assuming a separation of 2 $R_h$, the number of available frequency hop bins is given by Equation 1 below:

$$K = \frac{W}{2R_h} = \frac{102.4 \times 10^6}{200 \times 10^3} = 512$$

To see the limitations imposed by approaches (1) and (2), the complete generation of a set of code word patterns one member at a time can be considered. For example, the first pattern can be generated by following approach (1), which uses one bin for each hop and leaves K−1 bins available for the next code word. The generation of the next code word can use the application of both approaches (1) and (2) and results in K−2 bins being available for the third code word. This pattern is repeated for each subsequent code word. For example, 512 code words can be generated. Step 305 may also involve a partition into different sets of "M" members for each user. If "16-ary" coding is to be employed, method 300 could support, for example, 32 simultaneous users, with each user transmitting 4 bits of information over the "M" hop sequence. In some embodiments, at least some of the code words can be allocated to a single user, with 9 bits of information included in each "M" hop sequence. There can be a single hopping pattern for each user and the information bit is contained within the hop pattern itself. By using the generation of multiple orthogonal patterns, a set of M-hop patterns composed of $M=2^m$ hops each can also convey m bits of information.

Referring to FIG. 3, in step 306, the generated signal that is representative of the sequence of hopping patterns is transmitted to output terminal 112. Output terminal 112 receives the signal in step 307 and transmits the signal to receiver assembly 105 (shown in FIG. 1) of satellite 103 in step 308.

In step 309, antenna 120 receives the signal and, in step 310, antenna 120 transmits the signal to demodulating device 118. In step 311, demodulating device 118 receives the signal. In step 312, demodulating device 118 identifies the sequence of the hopping patterns. In some embodiments, the identification can be done by identifying the timing of the signal, the phase of the signal, the frequency of the signal, or by identifying the energy level of each of the signal. In step 313, demodulating device 118 determines at least one variable that corresponds to the sequence of hopping patterns, such as the unique textual word that corresponds to the sequence of hopping of patterns. As explained in more detail below with respect to FIGS. 6-7, steps 312 and 313 can be performed using various processes involving various algorithms.

In step 314, demodulating device 118 generates at least one output that is based on the determined variable. For example, in some embodiments, the output can be a textual message made of the words that are determined from the various sequences of hopping patterns that were received by demodulating device 118. In step 315, the output(s) are transmitted to computing device 114, and, in step 316, computing device 114 receives the output(s). In step 317, computing device 114 displays the output such that another user can view the output. In some embodiments, for example, demodulating device 118 can transmit a signal that is representative of the output and the signal can be processed by computing device 114 so that the output message can be displayed by computing device 114.

Figure 6:
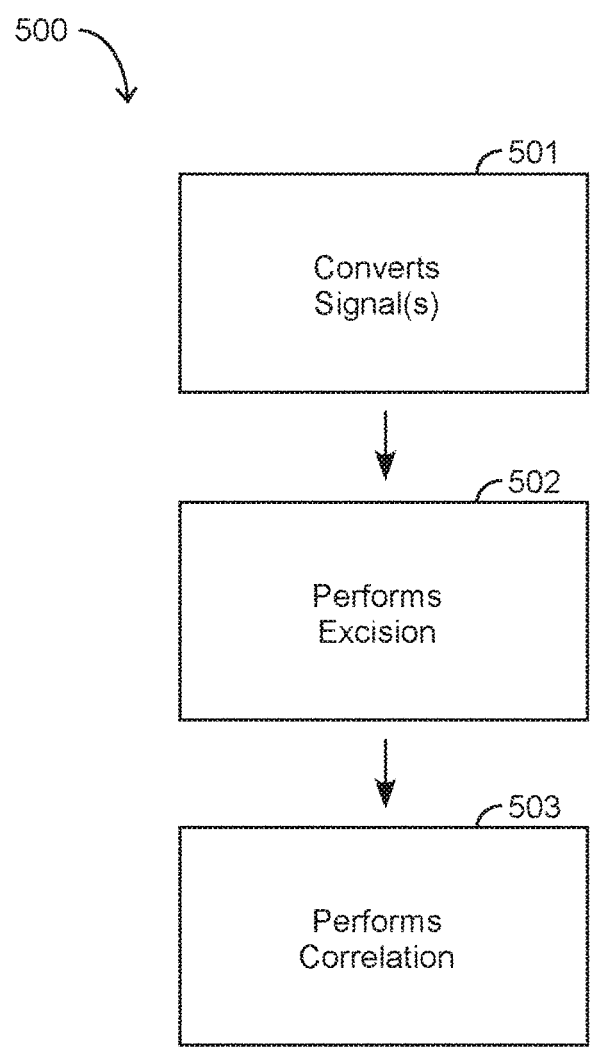
FIG. 6 is a block diagram of an exemplary process that can be used to perform at least some of the steps of the method shown in FIG. 3.

As described above, steps 312 and 313 can be performed using various processes involving various algorithms. For example, FIG. 6 illustrates a block diagram for a process 500 that can be used to perform steps 312 and 313. In step 501, demodulating device 118 (shown in FIG. 1) converts the received signals(s). In some embodiments, the Hilbert Transform can be used to convert the signal(s) to a set of complex samples located at positive frequencies.

In step 502, demodulating device 118 performs an excision using, for example, various software modules (not shown). For example, in some embodiments, a fast Fourier transform ("FFT") can be used to form a near real time estimate such that relatively large signals in frequency bins can be detected and demodulating device 118 can modify each of the code words in the set to zero out the affected frequency hops in a reference set that is stored within demodulating device 118. It should be noted that doing so after the generation of the phase-continuous reference signals, as described above, enables for the relative phase information for subsequent hops to be preserved, and facilitates continued coherent demodulation. The FFT need not be of relatively high order to accurately determine the frequency occupancy of the interference, as the accurate determination of the frequencies to be excised, can be accomplished in the reference set.

A strong interfering signal that occupies some fraction of the hops can be identified and extracted without affecting the rest of the hops and without incurring distortive effects, and with a relatively low reduction of total signal power. For example, excising 20% of the hops can result in a 1 decibel ("dB") reduction in signal power. The remaining signals are those that are below the threshold that is used to identify interfering signals, i.e., relatively comparable in power to the signal of interest. This approach can reduce the impact of interference without increasing the required power levels significantly. Of those remaining signals, the coherent nature of the hopping sequence provides additional protection. For example, the interfering signals can be occupying at least some of the non-excised hops that are correlated tones (i.e., having phases that align at certain intervals, such as the code word duration) with relative power levels equivalent to the signal of interest. Because the reference hop sequence is contiguous in phase (prior to excision), each hop begins with a phase that is dependent upon the phase of all of the previous hops that can all have frequencies that were randomly selected. As such, the starting phase of each hop is random. The interfering set of tones, relative to each of the hops in the reference set may appear to have random phases relative to the reference. Therefore, when these random phase offsets are averaged together as part of the hop-combining demodulator, the interfering signal may appear similar to noise. As such, the effects of the remaining interfering signals is reduced.

In step 503, demodulating device 118 performs a correlation of the signal. For example, in some embodiments, demodulating device 118 detects the presence and signal timing for the signal received that corresponds to data received from each user that had sent a message. In some embodiments, each user transmits a unique signature code word set that are a specific subset of each user's code word set. This can be used for both user detection and synchronization. The resulting correlation can be a complex number that includes both amplitude and phase offset between reference and received signals. In some embodiments, demodulating device 118 determines which of the identified user's code words were received, based on a unique decision process. For example, by using the concept that the clocks driving the reference and received signal generators are to be closely matched (i.e., relatively accurate), it is possible to maintain sufficient relative coherency (with an unknown but relatively constant phase offset) from the start to the end of the correlated sequence of hops, such that coherent hop combining can be achieved. As such, demodulating device 118 can correlate each sequence of hopping patterns with the corresponding user.

Figure 7:
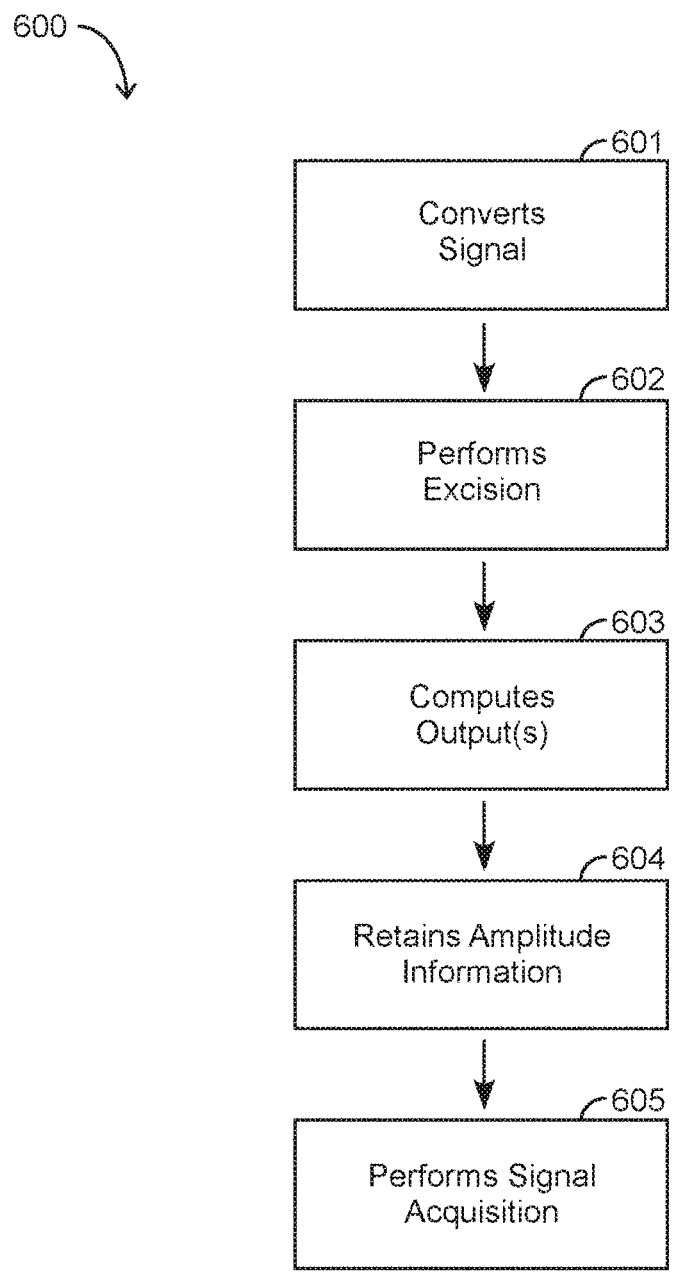
FIG. 7 is a block diagram of an exemplary alternative process that can be used to perform at least some of the steps of the method shown in FIG. 3.

In some embodiments, steps 312 and 313 (shown in FIG. 3) can be performed using alternative processes. For example, FIG. 7 illustrates a process 600 that can be used in place of process 500 (shown in FIG. 6) to perform steps 312 and 313. In step 601, demodulating device 118 (shown in FIG. 1) converts the signal that is received in the same manner as step 501 (shown in FIG. 6). In step 602, demodulating device 118 performs an excision is the same manner as step 502 (shown in FIG. 6). However, process 600 considers only the signal power. As such, the FFT does need to be of higher order compared to that of process 500, in order to minimize excess bandwidth in the filter bank.

In process 600, step 503 (shown in FIG. 6) is not performed. Rather, process 600 includes step 603 in which demodulating device 118 computes the magnitude of FFT outputs. In step 604, demodulating device 118 retains the amplitude information. In step 605, demodulating device 118 performs a signal acquisition. During signal acquisition, the sequence of hopping frequencies that represent the acquisition symbol are used to determine various frequencies' locations and to determine when those frequencies' magnitudes are accumulated. In some embodiments, the frequencies used for hopping are contiguous. In some embodiments, the resulting accumulations can be real numbers representing the total energy of the received symbol. A user can be acquired or determined when the accumulated output exceeds a specified threshold. In some embodiments, for communication modes, a set of hypothesis representing assigned communication symbols can be tested in a similar way as the acquisition symbol, wherein a likelihood estimate is made for each valid possible symbol. The algorithms used to perform process 600 can be the same as the algorithms used to perform process 500.

In some embodiments, for step 503, the excision process removes large interference sources. However, interference sources may be left that are of equivalent size to the signal of interest, and even if they appear like noise to demodulating device 118 based on the nature of the modulation and the excision process, that may still substantially degrade communications. In some embodiments, during step 503, a determination is made as to which of the M symbols, that was possible, was received, based on the strongest correlation magnitude computed, across all of the hops that were combined. That highest correlation magnitude may be a result of an interference source. In some embodiments, the signal of interest may have the second highest magnitude, or with some lower probability, third or further highest. Standard state of the art signal processors of this type, for higher order modulation, may choose the highest magnitude result, based on being the maximum likelihood. The algorithm, instead, relies upon repeating symbols as part of step 302, and a decision process that is different from true soft-decision processing or symbol combining is used, and it is not equivalent to a hard symbol decision.

In some embodiments, if the symbol were to be repeated, the intended symbol might again not be the highest. However, because the signal is contiguous in phase with hops randomly selected, it is more likely that the highest value due to interference, for each symbol duration, is mapped to a different symbol than in the previous case. This result is because (1) the residual interfering signal, even if initially correlated, appears like noise due to the features of the modulation (as described above), and (2) noise would result in a random selection of symbols. With a small number of repeats, it may be possible to determine an accurate symbol with higher probability. For example, instead of choosing the maximum likelihood symbol at each iteration, a record of the symbols corresponding to, for example, the 5 highest correlation values can be taken. After the symbols are undergo further iterations for some number of times, such as, for example, 3 times, there would be a total of 15 possible candidate symbols identified. In some embodiments, they may or may not be weighted according to their relative rank in each iteration. The symbol that most often occurs within, for example, the top 5 correlation values, is chosen as the correct symbol. With a higher probability, the correct symbol may occur more often than any other, resulting in increased reliability. In some embodiments, the symbol was repeated 3 times. If, as shown in the previous numerical example, M=512, then with a single user, it is possible to transmit 9 bits of information with a single symbol. Repeating the symbol, for example, 3 times may reduce this number to 3 bits per symbol, which is still higher than a 1 bit per symbol. Note that these numerical values are for illustrative purposes only and are not an inherent limitation of the invention. Furthermore, it should be noted that this is different than the step(s) used for soft-decision decoding of certain error correction codes, in particular of iterative codes, because each of the decisions are independent of the others and each of the symbols are orthogonal to each other (by design of the modulation). In some embodiments, there is no inherent information of the "nearest neighbor" that can be exploited.

As noted above, this decision process is not quite the same as true soft-decision processing or symbol combining, and is not equivalent to hard symbol decision as well, and can be referred, therefore, as a "firm" decision algorithm. Note that this performance is without additional error control coding.

This decision step then addresses the remaining elements of an interfering signal without requiring additional signal power. This also has efficacy because of the other elements of the invention, namely the orthogonal hop patterns and excision. The former is described in the paragraph above and without the latter, strong interfering signals will dominate the possible candidate symbols being selected (i.e., the "top 5" correlation values). Furthermore, this part of the algorithm also does not impose additional distortion upon the waveform and therefore facilitates performance.

As compared to known systems, the embodiments described herein provide systems and methods that enable the modulation and demodulation of signals that are effective in mitigating interference under contested and/or congested environments, and such systems and methods can be used in various communications applications, such as (but not limited to) low data rate satellite communications applications. For example, at least some of the embodiments described herein use a transmitter to receive at least one message, wherein the message corresponds to at least one set of data received from at least one user. A modulating device generates at least one signal that corresponds to the received message, wherein the signal includes at least one sequence of a plurality of hopping patterns. A receiver is coupled to the transmitter, wherein the receiver in order to receive the signal. After receiving the signal, a demodulating device identifies the sequence of the hopping patterns and determines at least one variable that corresponds to the sequence of the hopping patterns. At least one output that is based on the determined variable is generated, wherein the output is displayed such that at least one other user is enabled to view the output.

Exemplary embodiments of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a transmitter that is configured to receive at least one message, wherein the at least one message corresponds to at least one set of data received from at least one first user, said transmitter comprises a modulating device that is configured to generate at least one signal that corresponds to the received at least one message, wherein
the at least one signal is representative of at least one sequence of a plurality of hopping patterns that correspond to the at least one first user,
subsequent hops within the one sequence include different frequencies, and
the one sequence includes orthogonal frequency hops; and
a receiver coupled to said transmitter, wherein said receiver is configured to receive the at least one signal, said receiver comprises a demodulating device configured to:
identify the at least one sequence of the plurality of hopping patterns;
determine at least one variable that corresponds to the at least one sequence of the plurality of hopping patterns based, at least in part, on a phase offset between the at least one sequence of the plurality of hopping patterns and a reference signal; and
generate at least one output that is based on the determined at least one variable, wherein the at least one output is displayed such that at least one second user is enabled to view the at least one output simultaneously.

2. A system in accordance with claim 1, wherein the at least one variable that corresponds to the at least one sequence of the plurality of hopping patterns includes a unique textual word.

3. A system in accordance with claim 1, wherein said demodulating device is configured to identify the at least one sequence of the plurality of hopping patterns by being configured to identify the timing of the at least one signal.

4. A system in accordance with claim 1, wherein said demodulating device is configured to identify the at least one sequence of the plurality of hopping patterns by being configured to identify the energy level of the at least one signal.

5. A system in accordance with claim 1, wherein said transmitter is configured to receive a plurality of messages, wherein the plurality of messages corresponds to a plurality of sets of data received from a plurality of first users such that each message corresponds to a different set of data and wherein each set of data corresponds to a different first user.

6. A system in accordance with claim 5, wherein said modulating device is configured to generate the at least one signal such that the at least one signal is representative of a plurality of sequences of a plurality of hopping patterns such that each of the plurality of sequences corresponds to a different received message.

7. A system in accordance with claim 6, wherein said demodulating device is further configured to correlate each sequence of the plurality of hopping patterns with the corresponding first user.

8. A method of communicating data, wherein said method comprises:
  receiving at least one message, via a transmitter, wherein the at least one message corresponds to at least one set of data received from at least one first user;
  generating at least one signal that corresponds to the received at least one message, via a modulating device within the transmitter, wherein
    the at least one signal is representative of at least one sequence of a plurality of hopping patterns that correspond to the at least one first user,
    subsequent hops within the one sequence include different frequencies, and
    the one sequence includes orthogonal frequency hops;
  coupling a receiver to the transmitter to enable communication between the receiver and the transmitter;
  transmitting the at least one signal from the transmitter to the receiver;
  identifying the at least one sequence of the plurality of hopping patterns via a demodulating device within the receiver;
  determining at least one variable that corresponds to the at least one sequence of the plurality of hopping patterns based, at least in part, on a phase offset between the at least one sequence of the plurality of hopping patterns and a reference signal; and
  generating at least one output that is based on the determined at least one variable, wherein the at least one output is displayed such that at least one second user is enabled to view the at least one output simultaneously.

9. A method in accordance with claim 8, wherein determining at least one variable comprises determining a unique textual word that corresponds to the at least one sequence of the plurality of hopping patterns.

10. A method in accordance with claim 8, wherein identifying the at least one sequence of the plurality of hopping patterns comprises identifying the timing of the at least one signal.

11. A method in accordance with claim 8, wherein identifying the at least one sequence of the plurality of hopping patterns comprises identifying the energy level of the at least one signal.

12. A method in accordance with claim 8, wherein receiving at least one message comprises receiving a plurality of messages, wherein the plurality of messages corresponds to a plurality of sets of data received from a plurality of first users such that each message corresponds to a different set of data and wherein each set of data corresponds to a different first user.

13. A method in accordance with claim 12, wherein generating at least one signal comprises generating at least one signal such that the at least one signal is representative of a plurality of sequences of a plurality of hopping patterns such that each of the plurality of sequences corresponds to a different received message.

14. A method in accordance with claim 13, further comprising correlating each sequence of the plurality of hopping patterns with the corresponding first user.

15. A system comprising:
  a transmitter assembly comprising:
    a first computing device configured to receive at least one set of data from at least one first user, said first computing device is further configured to generate at least one message that corresponds to the at least one set of data;
    a transmitter coupled to said first computing device, wherein said transmitter is configured to receive the at least one message, said transmitter comprising a modulating device configured to generate at least one signal that corresponds to the received at least one message, wherein
      the at least one signal is representative of at least one sequence of a plurality of hopping patterns that correspond to the at least one first user,
      subsequent hops within the one sequence include different frequencies, and
      the one sequence includes orthogonal frequency hops; and
  a receiver assembly in communication with said transmitter assembly, wherein said receiver assembly comprises:
    a receiver configured to receive the at least one signal, said receiver comprising a demodulating device configured to:
      identify the at least one sequence of the plurality of hopping patterns;
      determine at least one variable that corresponds to the at least one sequence of the plurality of hopping patterns based, at least in part, on a phase offset between the at least one sequence of the plurality of hopping patterns and a reference signal; and
      generate at least one output that is based on the determined at least one variable; and
    a second computing device coupled to said receiver, wherein said second computing device is configured to display the at least one output such that at least one second user is enabled to view the at least one output simultaneously.

16. A system in accordance with claim 15, wherein the at least one variable that corresponds to the at least one sequence of the plurality of hopping patterns includes a unique textual word.

17. A system in accordance with claim 15, wherein said demodulating device is configured to identify the at least one sequence of the plurality of hopping patterns by being configured to identify the timing of the at least one signal.

18. A system in accordance with claim 15, wherein said demodulating device is configured to identify the at least one sequence of the plurality of hopping patterns by being configured to identify the energy level of the at least one signal.

19. A system in accordance with claim 15, wherein said first computing device is configured to receive a plurality of sets of data from a plurality of first users such that each set of data corresponds to a different first user, said first computing device is further configured to generate a plurality of messages such that each message corresponds to a different set of data.

20. A system in accordance with claim 19, wherein said transmitter is configured to receive the plurality of messages and said modulating device is configured to generate the at least one signal such that the at least one signal is representative of a plurality of sequences of a plurality of hopping patterns such that each of the plurality of sequences corresponds to a different received message.

21. A system in accordance with claim 20, wherein said demodulating device is further configured to correlate each sequence of the plurality of hopping patterns with the corresponding first user.

* * * * *